3,275,454
METHOD OF PRESERVING COMESTIBLES
Alexander Winterberg, 16 Kfar Giladi St., Tel Aviv, Israel
No Drawing. Filed Aug. 17, 1961, Ser. No. 131,995
Claims priority, application Israel, Sept. 2, 1960, 14,335
7 Claims. (Cl. 99—171)

It is already known to prepare wrapping or enveloping films on certain commodities, especially comestibles, which films are based on synthetic resins. Such comestibles have sometimes to be stored for prolonged periods and precautions must be taken to prevent the formation of moulds. Usually antimycotic substances are admixed to the plastic coating, much use having been made recently of sorbic acid in the form of a soluble salt thereof.

Sorbic acid in its pure state possesses advantageous antimycotic properties, which are much more pronounced than those of the salts of this acid. On the other hand, sorbic acid is a rather volatile substance and tends to evaporate whereupon the substance it was intended to safeguard will be liable to attack by moulds.

There are certain food-products which must be protected against mycotic attack, but which could not be protected adequately for prolonged periods by means known hitherto. Small loafs of cheese, such as the cheese loafs of Dutch and Danish cheese types have a rather short ripening time and it is usual to protect such cheeses after a relatively short ripening period by applying thereto a coating of paraffin. This coating has definite drawbacks, such as for example the rather frequent occurrence of cracks or of peeling off, resulting in the loss of the desired protection. Better results are obtainable when a suitable coating of synthetic resin is used, in which there is incorporated sorbic acid as an antimycotic substance. See for example my prior U.S. Patent No. 2,975,067. There are also known other methods of protection, such as for example the immediate packaging of the whole cheese after the salt bath in a suitable coating of a material such as for example Saran (a vinylidene chloride polymer or copolymer). However, such a coating or packaging must be effected under vacuum, preferably under suitable irradiation. This method is therefore expensive and there are frequent failures due to minute cracks in the film or in the seams of same.

As pointed out, the use of pure sorbic acid in such coatings constitutes a definite advantage, but even if incorporated into suitable synthetic resin films, such as for example films or polyvinylacetate, the protective action of the sorbic acid is of limited duration only, since it will evaporate and disappear whenever the product so protected has to be stored during prolonged periods.

It is an object of the present invention to provide a novel method for effecting an antimycotic coating of comestibles.

More particularly, it is an object of the present invention to provide an antimycotic coating which remains effective during prolonged periods. Other objects and a fuller understanding of the invention may be had by referring to the following description and claims.

It has been discovered that a coating having practically unlimited protective properties against moulds can be prepared by coating the product to be protected by means of a suitable coating in which there is incorporated the antimycotic agent, preferably crystalline sorbic acid, said coating, preferably of a synthetic resin, serving as an adhesive for a further gas-impermeable coating or sheet of suitable plastic material or metal foil.

It has been found that, for example, a whole small cheese can be coated as aforementioned, giving a protective coating of adequate duration for all practical purposes.

The novel process has the additional advantage that the whole items to be protected can be treated in one operation, comprising the coating with said adhesive-sorbic acid mixture (i.e. the synthetic resin containing the sorbic acid) and applying thereon the impermeable cover. The adhesive, i.e. the synthetic resin film, may be applied by dipping, if the item to be protected is of suitably small size, or by spraying or brushing if the item is of larger size. The impermeable coat is applied immediately, its ends are folded over, then secured to each other by means of said composite adhesive.

It has been found that the protection due to the sorbic acid lasts practically indefinitely as same is prevented from evaporating through the impermeable outer cover.

In order that a better understanding may be had of the invention, the same is illustrated in the following by way of example only.

*Example 1*

80 parts by weight of a poly-vinyl acetate emulsion of a solid content of 50% of dry polyvinyl acetate, 6–8 parts by weight of a non-toxic plasticiser, 5–12 parts by weight of finely granulated crystalline sorbic acid, and 5–10 parts by weight of water are thoroughly mixed. The quantity of the water depends on the temperature of application, during the hotter season less water is required as the emulsion will be sufficiently fluid for the intended application.

A whole cheese was dipped into the emulsion and immediately removed from same. A thin aluminum foil was wrapped on the still wet cheese; its ends were folded over, covered with the emulsion and attached to each other.

During a period of storage of over eighteen months, no moulds developed and the cheese retained its appearance and taste.

*Example 2*

88 parts by weight of a copolymer of vinylidene-chloride and vinyl chloride, 5–12 parts by weight of finely ground crystalline sorbic acid, and 1 part by weight of a silicone anti-foam emulsion were mixed thoroughly. Application as indicated in Example 1 gave equally favourable results.

As plasticiser there may be used suitable plasticisers of non-toxic nature, permitted for use with comestibles.

The emulsions according to Example 1 or 2 form a layer of a certain thickness on the cheese and fully enclose the latter. On placing the aluminum or plastic foil around the still wet coating, and folding the foil in the manner in which every wrapping material is folded around a body to be wrapped up, the wrinkles and folds made in the foil are pressed into the wet platic mass and the latter enters into wrinkles and folds filling the latter. The foil, where not folded, adheres to the plastic mass and eventually forms a double ply coating with the latter. In this way a complete air tightness of the wrapping is attained.

Although in the foregoing, examples have been given in which the use of emulsions was illustrated, it is clearly understood that use may be made of any suitable adhesive, of such nature as to be permissible for the intended use with foodstuffs and compatible with sorbic acid, including a sufficient quantity of sorbic acid for enhancing said coating with anti-mycotic properties.

While the examples have described the use of the new method with cheese only, it would be within the scope of the invention to treat other comestibles in the same way, e.g. sausages and other processed meat, bread the like more.

What I claim is:
1. A method of preserving a comestible, comprising, applying to the comestible a liquid coating having adhesive properties and containing an antimycotic agent normally having a tendency to evaporate over a period of time, while said coating is still wet wrapping thereover a sheet of an impermeable material, and allowing said coating to dry so as to produce a wrapped comestible in which the coating containing the antimycotic agent adheres both to the comestible and to the impermeable sheet and fills the wrinkles and folds of the latter.

2. A method as defined in claim 1, wherein said antimycotic agent is crystalline sorbic acid present from 5–10 parts by weight per 100 parts of said liquid coating.

3. A method as defined in claim 1, wherein said liquid coating is an aqueous emulsion of a synthetic resin.

4. A method as defined in claim 3, wherein said synthetic resin is polyvinyl acetate.

5. A method as defined in claim 3, wherein said synthetic resin is a copolymer of vinylidene chloride and vinyl chloride.

6. A method as defined in claim 1, wherein said sheet is of metal foil.

7. A method as defined in claim 1, wherein said sheet is of plastic film.

References Cited by the Examiner

UNITED STATES PATENTS

| | | | |
|---|---|---|---|
| 2,733,151 | 1/1956 | Zuercher | 99—169 X |
| 2,856,294 | 10/1958 | Brown | 99—178 |
| 2,975,067 | 3/1961 | Winterberg | 99—169 X |

OTHER REFERENCES

"Refrigerating Engineering," February 1954, pp. 45–48, article entitled Protective Packaging of Frozen Foods.

"The Condensed Chemical Dictionary," 1956, 5th ed., by A. and E. Rose, pub. by Reinhold Pub. Corp., New York, pp. 884 and 885, articles entitled Polyvinyl Acetate and Polyvinyl Alcohol.

A. LOUIS MONACELL, *Primary Examiner.*

ABRAHAM H. WINKELSTEIN, HYMAN LORD, *Examiners.*

G. N. MANN, *Assistant Examiner.*